(12) United States Patent
Hoshikawa et al.

(10) Patent No.: US 7,709,566 B2
(45) Date of Patent: *May 4, 2010

(54) POLYTETRAFLUOROETHYLENE AQUEOUS DISPERSION AND ITS PRODUCT

(75) Inventors: Jun Hoshikawa, Tokyo (JP); Shinya Higuchi, Tokyo (JP); Yasuhiko Matsuoka, Tokyo (JP); Nobuyuki Yamagishi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/106,515

(22) Filed: Apr. 21, 2008

(65) Prior Publication Data

US 2008/0214714 A1    Sep. 4, 2008

Related U.S. Application Data

(63) Continuation of application No. PCT/JP2006/320872, filed on Oct. 19, 2006.

(30) Foreign Application Priority Data

Oct. 20, 2005  (JP) ............................. 2005-305660

(51) Int. Cl.
*C03C 25/28*    (2006.01)
*C09D 5/02*    (2006.01)
(52) U.S. Cl. ...................... 524/319; 524/378
(58) Field of Classification Search ............. 524/319, 524/378
See application file for complete search history.

(56) References Cited

U.S. PATENT DOCUMENTS

| | | | |
|---|---|---|---|
| 6,825,304 B2 * | 11/2004 | Kapeliouchko et al. | 526/247 |
| 6,861,466 B2 * | 3/2005 | Dadalas et al. | 524/544 |
| 2006/0276574 A1 | 12/2006 | Hoshikawa et al. | |
| 2007/0015857 A1 | 1/2007 | Hoshikawa et al. | |
| 2007/0015864 A1 | 1/2007 | Hintzer et al. | |
| 2007/0025902 A1 | 2/2007 | Hintzer et al. | |
| 2007/0027251 A1 | 2/2007 | Hintzer et al. | |
| 2008/0015304 A1 | 1/2008 | Hintzer et al. | |
| 2008/0033063 A1 | 2/2008 | Hoshikawa et al. | |
| 2008/0114122 A1 | 5/2008 | Brothers et al. | |

FOREIGN PATENT DOCUMENTS

| | | |
|---|---|---|
| EP | 0 712 882 A1 | 5/1996 |
| EP | 1 489 104 A1 | 12/2004 |
| EP | 1 533 325 A1 | 5/2005 |
| EP | 1 688 441 A1 | 8/2006 |
| JP | 39-24263 | 10/1964 |
| JP | 45-39829 | 12/1970 |
| JP | 8-269285 | 10/1996 |
| JP | 11-152385 | 6/1999 |
| JP | 2000-198899 | 7/2000 |
| JP | 2001-89624 | 4/2001 |
| JP | 2002-317003 | 10/2002 |
| JP | 2003-119204 | 4/2003 |
| WO | WO 2005/042593 A1 | 5/2005 |
| WO | WO 2007/140112 A1 | 12/2007 |

OTHER PUBLICATIONS

U.S. Appl. No. 12/104,680, filed Apr. 17, 2008, Higuchi, et al.
U.S. Appl. No. 12/106,515, filed Apr. 21, 2008, Hoshikawa, et al.
U.S. Appl. No. 12/110,494, filed Apr. 28, 2008, Matsuoka, et al.
Handbook of Fluororesins, p. 28, edited by Takaomi Satokawa, published by Nikkankogyo Shimbun.
U.S. Appl. No. 12/391,725, filed Feb. 24, 2009, Takagi, et al.

* cited by examiner

*Primary Examiner*—William K Cheung
(74) *Attorney, Agent, or Firm*—Oblon, Spivak, McClelland, Maier & Neustadt, L.L.P.

(57) ABSTRACT

To provide a polytetrafluoroethylene (PTFE) aqueous dispersion, which does not substantially contain ammonium perfluorooctanoate and is excellent in mechanical stability, wettability, permeability and coating property, and its product.

A PTFE aqueous dispersion comprising from 15 to 70 mass % of PTFE fine particles having an average particle size of from 0.1 to 0.5 μm, from $1\times10^{-5}$ to 0.5 mass %, based on the mass of the PTFE, of a fluorinated emulsifier of the formula (1): $XCF_2CF_2(O)_mCF_2CF_2OCF_2COOA$, wherein X is a hydrogen atom or a fluorine atom, A is a hydrogen atom, an alkali metal or $NH_4$ and m is an integer of 0 or 1, and from 1 to 20 mass %, based on the mass of the PTFE, of a nonionic surfactant.

6 Claims, No Drawings

POLYTETRAFLUOROETHYLENE AQUEOUS DISPERSION AND ITS PRODUCT

TECHNICAL FIELD

The present invention relates to a polytetrafluoroethylene (hereinafter referred to as PTFE) aqueous dispersion and its product.

BACKGROUND ART

Heretofore, PTFE formed by an emulsion polymerization method is obtained as an aqueous PTFE emulsion containing PTFE fine particles, by polymerizing tetrafluoroethylene (hereinafter referred to as TFE) in the presence of e.g. an aqueous medium, a polymerization initiator, ammonium perfluorooctanoate (hereinafter referred to as APFO) which is an emulsifier, a stabilizing agent such as paraffin wax (Non-Patent Document 1).

However, it has been pointed out that APFO has an accumulation potential in a body of a small animal, and with respect to an aqueous PTFE emulsion formed by an emulsion polymerization method by using APFO, there has been a concern expressed about an adverse effect to ecosystem. Further, there is the same concern about a PTFE product obtained by using the obtained aqueous PTFE emulsion.

As a PTFE emulsion polymerization by using an emulsifier other than APFO, an emulsion polymerization method to obtain an aqueous PTFE emulsion by using an anionic surfactant which does not contain a fluorine atom, is proposed (for example, Patent Document 1). However, by this method, only an aqueous PTFE emulsion having a relatively low concentration is obtained, and there is a problem such that the obtained PTFE has not enough physical property.

Further, an emulsion polymerization method to obtain an aqueous PTFE emulsion by using a fluorinated emulsifier other than APFO, is proposed (for example, Patent Document 2). However, by this method, the obtained aqueous PTFE emulsion has poor wettability and low permeability when it is attempted to impregnate it into a porous material. Therefore, it has a problem such that when it is applied on a metal plate for coating, it tends to be repelled. Further, this aqueous PTFE emulsion has a low mechanical stability, and there is a problem such that when the emulsion is transferred by a pump, coagulates tend to be formed. The above problems or their solutions are not described in Patent Document 2, and a PTFE product is not described either.

In Examples in Patent Document 3, $CF_3CF_2OCF(CF_3)CF_2OCF(CF_3)COONH_4$ is disclosed as an emulsifier, but it has been found that this emulsifier has a higher bioaccumulation potential than APFO.

Patent Document 1: JP-B-45-39829
Patent Document 2: JP-B-39-24263
Patent Document 3: JP-A-2003-119204
Non-Patent Document 1: Handbook of Fluororesins P. 28, edited by Takaomi Satokawa, published by Nikkankogyo Shimbun.

DISCLOSURE OF THE INVENTION

Object to be Accomplished by the Invention

The present invention has an object to provide an aqueous PTFE emulsion which does not substantially contain APFO and is excellent in mechanical stability and wettability, and which has excellent characteristics.

Further, the present invention has an object to provide a PTFE product which does not substantially contain APFO.

Means to Accomplish the Object

The present inventors have conducted extensive studies to overcome the above problems, and as a result, they have found that a PTFE aqueous dispersion obtained by incorporating a nonionic surfactant to an aqueous PTFE emulsion obtained by aqueous emulsion polymerization of tetrafluoroethylene (hereinafter referred to as TFE) in the presence of a specific fluorinated emulsifier, is excellent in wettability and mechanical stability, and it is possible to obtain a desirable PTFE product. The present invention has been accomplished on the basis of these discoveries.

Namely, the present invention provides the followings:

1. A PTFE aqueous dispersion comprising from 15 to 70 mass % of PTFE fine particles having an average particle size of from 0.1 to 0.5 μm, from $1\times10^{-5}$ to 0.5 mass %, based on the mass of the PTFE, of a fluorinated emulsifier of the formula (1), and from 1 to 20 mass %, based on the mass of the PTFE, of a nonionic surfactant:

$$XCF_2CF_2(O)_mCF_2CF_2OCF_2COOA \qquad \text{Formula (1)}$$

wherein X is a hydrogen atom or a fluorine atom, A is a hydrogen atom, an alkali metal or $NH_4$, and m is an integer of 0 or 1.

2. The polytetrafluoroethylene aqueous dispersion according to the above 1, wherein the nonionic surfactant is a nonionic surfactant of the formula (2) and/or the formula (3):

$$R^1\text{—O-A-H} \qquad \text{Formula (2)}$$

wherein $R^1$ is a $C_{8-18}$ alkyl group, and A is a polyoxyalkylene chain comprising from 5 to 20 oxyethylene groups and from 0 to 2 oxypropylene groups;

$$R^1\text{—}C_6H_4\text{—O-B-H} \qquad \text{Formula (3)}$$

wherein $R^2$ is a $C_{4-12}$ alkyl group, and B is a polyoxyethylene chain comprising from 5 to 20 oxyethylene groups.

3. The polytetrafluoroethylene aqueous dispersion according to the above 1, wherein the nonionic surfactant is a nonionic surfactant of the formula (4):

$$R^3\text{—O-D-H} \qquad \text{Formula (4)}$$

wherein $R^3$ is a $C_{8-18}$ alkyl group, and D is a polyoxyalkylene chain comprising from 5 to 20 oxyethylene groups and from 0.1 to 3 oxybutylene groups.

4. The polytetrafluoroethylene aqueous dispersion according to any one of the above 1 to 3, wherein the content of the polytetrafluoroethylene fine particles is from 50 to 70 mass %.

5. The polytetrafluoroethylene aqueous dispersion according to any one of the above 1 to 4, wherein the fluorinated emulsifier of the above formula (1) is $CF_3CF_2OCF_2CF_2OCF_2COONH_4$.

6. A polytetrafluoroethylene product, which is obtained from the polytetrafluoroethylene aqueous dispersion as defined in any one of the above 1 to 5, and which contains from $1\times10^{-7}$ to 0.5 mass %, based on the mass of the polytetrafluoroethylene, of the fluorinated emulsifier of the formula (1).

Effects Of The Invention

The PTFE aqueous dispersion of the present invention does not substantially contain APFO and is excellent in wettability and mechanical stability. Further, the PTFE product obtained by using the PTFE aqueous dispersion of the present invention does not substantially contain APFO, and it is thus desirable.

BEST MODE FOR CARRYING OUT THE INVENTION

In the PTFE aqueous dispersion of the present invention, the fluorinated emulsifier of the formula (1) is contained in a specific amount:

$$XCF_2CF_2(O)_mCF_2CF_2OCF_2COOA \qquad \text{Formula (1)}$$

wherein X is a hydrogen atom or a fluorine atom, A is a hydrogen atom, an alkali metal or $NH_4$, and m is an integer of 0 or 1.

The fluorinated emulsifier of the formula (1) has a good function to stabilize polymerization for PTFE fine particles, and it is suitably used.

X is a hydrogen atom or a fluorine atom, but it is preferably a fluorine atom from the viewpoint of polymerization stability. Further, a value for m is preferably 1 since the stability for polymerization and the mechanical stability of PTFE aqueous dispersion are good.

A may, for example, be H, Li, Na, K, $NH_4$. However, $NH_4$ is particularly preferred because it has good solubility in water, and no metal ion component will remain in the PTFE product as an impurity.

Among the fluorinated emulsifiers of the formula (1), particularly preferred is e.g. $CF_3CF_2CF_2CF_2OCF_2COONH_4$ or $CF_3CF_2OCF_2CF_2OCF_2COONH_4$ (hereinafter referred to as EEA), and EEA is more preferred.

The fluorinated emulsifier of the formula (1) is obtained by a known fluorination method such as a liquid phase fluorination method, wherein the corresponding non-fluorinated carboxylic acid or an ester of a partly fluorinated carboxylic acid, is used and reacted with fluorine in a liquid phase, a fluorination method using a cobalt fluoride, or an electrochemical fluorination method, and the obtained fluorinated ester bond is hydrolyzed, followed by purification and then by neutralization with ammonia.

The content of the fluorinated emulsifier of the formula (1) in the PTFE aqueous dispersion of the present invention, is preferably from $1 \times 10^{-5}$ to 0.5 mass %, more preferably from $5 \times 10^{-5}$ to 0.45 mass %, most preferably from $1 \times 10^{-4}$ to 0.4 mass %. If the above content is larger than 0.5 mass %, the viscosity of the PTFE aqueous dispersion becomes too high, whereby the thickness of a film will be too thick at the time of coating, and cracks may be formed. Further, if the above content is smaller than $1 \times 10^{-5}$ mass %, the dispersion stability of PTFE fine particles becomes low.

The average particle size of the PTFE fine particles contained in the PTFE aqueous dispersion of the present invention is from 0.1 to 0.5 μm, preferably from 0.18 to 0.45 μm, most preferably from 0.20 to 0.35 μm. If the average particle size is smaller than 0.1 μm, there is a case such that cracks may be formed on a coated film, and if it is larger than 0.5 μm, the PTFE fine particles in the PTFE aqueous dispersion tend to precipitate too quickly, whereby the storage stability tends to deteriorate, such being undesirable.

The number average molecular weight of PTFE may be optionally selected but is preferably in a range of from 300,000 to 30,000,000, most preferably in a range of from 500,000 to 25,000,000. If the number average molecular weight is smaller than 300,000, the mechanical properties of PTFE tend to deteriorate, and if it is larger than 30,000,000, it is industrially difficult to produce such PTFE.

Further, the average molecular weight is obtained by the method described by Suwa et al. in Journal of Applied Polymer Science, 17, 3253 (1973), using crystallization heat.

Further, the standard specific gravity (hereinafter referred to also as SSG) of PTFE becomes an index for the average molecular weight of PTFE in which TFE is alone polymerized. It is possible to notionally separate PTFE into a high molecular weight PTFE when SSG is from 2.14 to less than 2.22, and a low molecular weight PTFE when SSG is from 2.22 to 2.4, but the physical properties of PTFE deteriorate when it has a low molecular weight. Therefore, SSG is preferably from 2.14 to less than 2.22, most preferably from 2.15 to 2.21.

The PTFE concentration in the PTFE aqueous dispersion of the present invention is from 15 to 70 mass %, preferably from 20 to 70 mass %. The one having a PTFE concentration of from 15 to 70 mass % is suitably used for an application to impregnate the PTFE aqueous dispersion into a woven cloth or string of fiber such as glass fiber, an application to mix it with an inorganic powder or a plastic powder, an application to add it in a small amount to a coating material. If the PTFE concentration is lower than 15 mass %, the viscosity becomes too low, whereby the PTFE fine particles tend to sediment, and the storage stability tends to deteriorate. Further, if the PTFE concentration is higher than 70 mass %, the viscosity becomes too high, whereby impregnation permeability tends to be insufficient, and dispersibility during mixing tends to decrease.

Further, particularly, in an application to use the PTFE aqueous dispersion for coating, or to fabricate it into PTFE fiber, the PTFE concentration is particularly preferably from 50 to 70 mass %, further preferably from 52 to 68 mass %. If the PTFE concentration is lower than 50 mass %, it is difficult to obtain the prescribed coating amount and the prescribed size of the PTFE fiber. Further, if the PTFE concentration is higher than 70 mass %, the viscosity tends to be too high, whereby the thickness of a film tends to be too thick, such being undesirable.

In the present invention, PTFE is not only a homopolymer of TFE, but it includes a so-called modified PTFE which contains a trace amount of polymerized units based on a copolymer component which may be copolymerized with TFE, such as a halogenated ethylene such as chlorotrifluoroethylene, a halogenated propylene such as hexafluoropropylene, or a fluorovinyl ether such as a perfluoro(alkyl vinyl ether), at a level such that a melt-processability cannot substantially be carried out.

The PTFE aqueous dispersion of the present invention contains a nonionic surfactant. The nonionic surfactant used for the PTFE aqueous dispersion of the present invention is preferably one represented by the formula (2) and/or the formula (3):

$$R^1\text{—O-A-H} \qquad \text{Formula (2)}$$

wherein $R^1$ is a $C_{8-18}$ alkyl group, and A is a polyoxyalkylene chain comprising from 5 to 20 oxyethylene groups and from 0 to 2 oxypropylene groups:

$$R^1\text{—}C_6H_4\text{—O-B-H} \qquad \text{Formula (3)}$$

wherein $R^2$ is a $C_{4-12}$ alkyl group, and B is a polyoxyethylene chain comprising from 5 to 20 oxyethylene groups.

Further, the nonionic surfactant used for the PTFE aqueous dispersion of the present invention is preferably one represented by the formula (4):

$$R^3\text{—O-D-H} \qquad \text{Formula (4)}$$

wherein $R^3$ is a $C_{8-18}$ alkyl group, and D is a polyoxyalkylene chain comprising from 5 to 20 oxyethylene groups and from 0.1 to 3 oxybutylene groups.

In the formula (2), the alkyl group as $R^1$ has a number of carbon atoms being from 8 to 18, preferably from 10 to 16, particularly preferably from 12 to 16. If the number of carbon atoms is larger than 18, the surfactant has a high pour point and is difficult to handle, and the PTFE aqueous dispersion tends to have poor storage stability because the PTFE fine particles readily sediment when the PTFE aqueous dispersion is left to stand for a long time. If the number of carbon atoms is smaller than 8, the PTFE aqueous dispersion has a high surface tension, and the wettability tends to decrease.

In the formula (2), the hydrophilic group A is a polyoxyalkylene chain comprising from 5 to 20 oxyethylene groups and from 0 to 2 oxypropylene groups, preferably comprising from 7 to 12 oxyethylene groups and from 0 to 2 oxypropylene groups, in view of viscosity and stability. Especially, it is preferred that the hydrophilic group A has from 0.5 to 1.5 oxypropylene groups because the defoaming property is good.

In the formula (3), the alkyl group as $R^2$ has a number of carbon atoms being from 4 to 12, preferably from 6 to 10, particularly preferably from 8 to 9. If the alkyl group has a number of carbon atoms smaller than 4, the PTFE aqueous dispersion has a high surface tension and has poor permeability and wettability, and if the number of carbon atoms is larger than 12, the PTFE aqueous dispersion tends to have poor storage stability because the PTFE fine particles readily sediment when the PTFE aqueous dispersion is left to stand for a long time.

In the formula (3), the hydrophilic group B is a polyoxyalkylene chain comprising from 5 to 20 oxyethylene groups, preferably comprising from 6 to 16 oxyethylene groups, particularly preferably from 7 to 12 oxyethylene groups, in view of viscosity and stability.

In the formula (4), the alkyl group as $R^3$ has a number of carbon atoms being from 8 to 18, preferably from 10 to 16, particularly preferably from 12 to 16. If the number of carbon atoms is larger than 18, the surfactant has a high pour point and is difficult to handle, and the PTFE aqueous dispersion tends to have poor storage stability because the PTFE fine particles readily sediment when the PTFE aqueous dispersion is left to stand for a long time. If the number of carbon atoms is smaller than 8, the PTFE aqueous dispersion has a high surface tension, and the permeability and wettability tend to decrease.

In the formula (4), the hydrophilic group D is a polyoxyalkylene chain comprising from 5 to 20 oxyethylene groups and from 0.1 to 3 oxybutylene groups, preferably comprising from 7 to 12 oxyethylene groups and from 0.1 to 3 oxybutylene groups, in view of viscosity and stability. It is preferred that the hydrophilic group D has from 0.5 to 2 oxybutylene groups because the defoaming property is good. Further, the number of oxybutylene groups is more preferably from 0.7 to 1.7, particularly preferably from 0.9 to 1.5. The number of oxyethylene groups is preferably from 6 to 15, particularly preferably from 7 to 12.

The nonionic surfactant of the formula (2), the formula (3) or the formula (4) preferably has an average molecular weight of from 450 to 800, more preferably from 500 to 750, particularly preferably from 550 to 700. A surfactant having an average molecular weight larger than 800 is not preferable, because it would have a high pour point and would be difficult to handle. A surfactant having an average molecular weight smaller than 450 is not preferable either, because the PTFE aqueous dispersion would have poor permeability or wettability.

Specific examples of the nonionic surfactant of the formula (2) include nonionic surfactants having molecular structures such as $C_{13}H_{27}$—$(OC_2H_4)_{10}$—OH, $C_{12}H_{25}$—$(OC_2H_4)_{10}$—OH, $C_{10}H_{21}CH(CH_3)CH_2$—$(OC_2H_4)_9$—OH, $C_{13}H_{27}$—$(OC_2H_4)_9$—$OCH(CH_3)CH_2$—OH, $C_{16}H_{33}$—$(OC_2H_4)_{10}$—OH and $HC(C_5H_{11})(C_7H_{15})$—$(OC_2H_4)_9$—OH and commercial products such as the TERGITOL (registered trademark) 15S series manufactured by Dow and the LIONOL (registered trademark) TD series manufactured by Lion.

Specific examples of the nonionic surfactant of the formula (3) include nonionic surfactants having molecular structures such as $C_8H_{17}$—$C_6H_4$—$(OC_2H_4)_{10}$—OH and $C_9H_{19}$—$C_6H_4$—$(OC_2H_4)_{10}$—OH and commercial products such as the Triton (registered trademark) X series manufactured by Dow and the NIKKOL (registered trademark) OP or NP series manufactured by Nikko Chemicals.

Specific examples of the nonionic surfactant of the formula (4) may, for example, be $C_{13}H_{27}OCH_2CH(C_2H_5)O(C_2H_4O)_8H$, $C_{10}H_{21}CH(CH_3)CH_2OCH_2CH(C_2H_5)O(C_2H_4O)_8H$, $C_{12}H_{25}OCH_2CH(C_2H_5)O(C_2H_4O)_8H$, $C_8H_{17}OCH_2CH(C_2H_5)O(C_2H_4O)_{10}H$, $C_{13}H_{27}OCH_2CH_2OCH_2CH(C_2H_5)O(C_2H_4O)_8H$, $C_{10}H_{21}CH(CH_3)CH_2O(C_2H_4O)_9CH_2CH(C_2H_5)OH$, $C_{16}H_{33}OC_2H_4OCH(C_2H_5)CH_2O(C_2H_4O)_9H$, $C_{12}H_{25}OCH_2CH(C_2H_5)O(C_2H_4O)_8CH_2CH(C_2H_5)OH$, $C_{13}H_{27}OCH(CH_3)CH(CH_3)O(C_2H_4O)_8H$, $C_{12}H_{25}OCH(CH_3)CH(CH_3)O(C_2H_4O)_8H$, $C_{13}H_{27}O(CH_2)_4O(C_2H_4O)_8H$, and $C_{12}H_{25}O(CH_2)_2CH(CH_3)O(C_2H_4O)_8H$.

Nonionic surfactants of the formula (2) and/or the formula (3) may be used alone or in combination as a mixture of two or more of them.

Further, nonionic surfactants of the formula (4) may be used alone or in combination as a mixture of two or more of them. Moreover, it is possible to use the nonionic surfactant of the formula (4) and the nonionic surfactant of the formula (2) or the formula (3) in combination as a mixture.

Since a nonionic surfactant is a mixture of at least two substances having different molecular structures, the numbers of carbon atoms of the alkyl groups and the numbers of the oxyethylene groups and oxypropylene groups in the polyoxyalkylene chain in a nonionic surfactant are averaged and, therefore, may not be integers.

The content of the nonionic surfactant in the PTFE aqueous dispersion of the present invention is from 1 to 20 mass %, preferably from 1.5 to 15 mass %, particularly preferably from 2 to 10 mass %, based on the mass of PTFE.

If the above content is less than 1 mass %, such is not preferable, because the mechanical stability of the PTFE aqueous dispersion decreases, and the wettability decreases. Further, if the above content is larger than 20 mass %, such is not only uneconomical, but there may be a case such that cracks tend to form on the coated film, and durability of the PTFE product may decrease.

Particularly, in order to improve the wettability at the time of coating and to prevent cracking, from 6.0 to 10.0 mass % of the nonionic surfactant is preferably contained, based on the mass of PTFE.

In the present invention, the PTFE aqueous dispersion is a general term for a PTFE low-concentration aqueous dispersion obtained by dissolving a nonionic surfactant in an aqueous PTFE emulsion obtained by emulsion polymerization, a PTFE high-concentration aqueous dispersion obtained by concentrating the PTFE low-concentration aqueous dispersion, and a PTFE aqueous dispersion obtained by adding a nonionic surfactant, a nonfluorinated emulsifier, various leveling agents, a preservative, a coloring agent, a filler, an organic solvent or other known components, into the PTFE high-concentration aqueous dispersion.

An aqueous PTFE emulsion used for producing the PTFE aqueous dispersion of the present invention may be obtained by emulsion polymerization of a TFE monomer preferably under a pressure of from 0.5 to 3.0 MPa, for preferably over a period of time of from 1 to 20 hours, in the presence of an aqueous medium, an polymerization initiator, a fluorinated emulsifier of the formula (1) and a stabilizing agent such as paraffin wax.

The amount of the fluorinated emulsifier of the formula (1) to be used in the process for emulsion polymerization of the TFE monomer, is preferably from 0.15 to 2.0 mass %, more preferably from 0.2 to 1.0 mass %, particularly preferably from 0.2 to 0.5 mass %, based on the mass of the PTFE to be formed.

As the stabilizing agent, paraffin wax, fluorinated oil, fluorinated solvent or silicone oil, is preferred. Such stabilizing agents may be used alone or in combination as a mixture of two or more of them. As the stabilizing agent, paraffin wax is more preferred. The paraffin wax may be liquid, semisolid or solid at room temperature, but it is preferably a saturated hydrocarbon having at least 12 carbon atoms. The melting point of the paraffin wax is usually preferably from 40 to 65° C., more preferably from 50 to 65° C. The amount of the stabilizing agent to be used is preferably from 0.1 to 12 mass %, more preferably from 0.1 to 8 mass %, based on the mass of water to be used.

As the polymerization initiator, a water-soluble radical initiator or a water-soluble redox type catalyst may, for example, be preferably used. As the water-soluble radical initiator, a persulfate such as ammonium persulfate or potassium persulfate, or a water-soluble organic peroxide such as disuccinic acid peroxide, bisgultaric acid peroxide or tert-butyl hydroperoxide, is preferred. Such polymerization initiators may be used alone or in combination as a mixture of two or more of them. Further, an oil-soluble initiator may be used in the same manner. As the polymerization initiator, disuccinic acid peroxide is more preferred.

The amount of the polymerization initiator to be used is usually preferably from 0.01 to 0.20 mass %, more preferably from 0.01 to 0.15 mass %, based on the final yield of PTFE.

By the above emulsion polymerization, it is possible to obtain an aqueous emulsion containing the PTFE fine particles having the above average particle size of a primary particle and standard specific gravity.

The PTFE concentration in the aqueous PTFE emulsion obtained by emulsion polymerization is preferably from 15 to 40 mass %, more preferably from 17 to 35 mass %, particularly preferably from 20 to 30 mass %.

The PTFE low-concentration aqueous dispersion may be obtained by incorporating the nonionic surfactant to the aqueous PTFE emulsion after emulsion polymerization.

The PTFE low-concentration aqueous dispersion may be concentrated by a known concentrating method to obtain a PTFE high-concentration aqueous dispersion having a PTFE concentration of from 50 to 70 mass %. As the concentrating method, for example, centrifugal sedimentation, electrophoresis, phase separation and other known methods are available, as disclosed in Handbook of Fluorine resins, p. 32 (edited by Takaomi Satokawa, published by Nikkankogyo Shimbun).

The phase separation is a method wherein the dispersion is heated and then left to stand for a certain period of time to have the PTFE fine particles sedimented. Specifically, it is a method wherein in an aqueous PTFE emulsion, a nonionic surfactant having a concentration of from 8 to 20 mass %, preferably from 12 to 18 mass %, based on the mass of PTFE, is dissolved to obtain a PTFE low-concentration aqueous dispersion, then, the PTFE low-concentration aqueous dispersion is heated at from 50 to 100° C., preferably from 60 to 90° C. and left to stand from 1 to 100 hours, preferably from 5 to 20 hours, whereupon the PTFE high-concentration aqueous dispersion accumulated at the bottom due to a difference in the specific gravity, is recovered.

The pH of the PTFE aqueous dispersion, the PTFE low-concentration aqueous dispersion or the PTFE high-concentration aqueous dispersion of the present invention is preferably from 2 to 13, particularly preferably from 3 to 11, and it is adjusted by adding a pH controlling agent such aqueous ammonia.

The electrophoresis is a method of utilizing the nature that PTFE fine particles are negatively charged. Specifically, it is a method wherein a nonionic surfactant in an amount of from 1 to 10 mass %, preferably from 2 to 8 mass %, based on the mass of PTFE is dissolved in an aqueous PTFE emulsion to obtain a PTFE low-concentration aqueous dispersion, then, a voltage of from 50 to 500 V/m, preferably from 100 to 300 V/m, is applied to the PTFE low-concentration aqueous dispersion in a reactor having a semi-permeable membrane such as a cellulose membrane, to have the PTFE fine particles electrophoresed and collected on the semi-permeable membrane surface, whereupon the PTFE high-concentration aqueous dispersion accumulated at the bottom due to a difference in the specific gravity, is recovered. The pH of the PTFE low-concentration aqueous dispersion before concentration is preferably from 2 to 10, particularly preferably from 3 to 9.

The content of the fluorinated emulsifier of the formula (1) in the PTFE high-concentration aqueous dispersion is smaller than the content of the fluorinated emulsifier in the PTFE low-concentration aqueous dispersion, since a certain amount is removed together with supernatant liquid in the process for concentration.

Further, the fluorinated emulsifier of the formula (1) is expensive, and it is meaningful to recover the fluorinated emulsifier of the formula (1) from the supernatant liquid by a known method and recycle it. The recovering method may, for example, be a method of adsorbing it with an anion exchange resin, a method of adsorbing it with a synthetic adsorbent, a method of adsorbing it with activated carbon or a method of occluding it in a layered double hydroxide, followed by regeneration.

The content of the fluorinated emulsifier of the formula (1) may be reduced by a known method before the process for concentration.

The method for reducing the content of the fluorinated emulsifier may, for example, be a method wherein an anion exchange resin and a PTFE low-concentration aqueous dispersion are brought into contact with each other to let the anion exchange resin adsorb the emulsifier as described in WO00/35971 (JP-A-2002-532583).

The adsorbed fluorinated emulsifier of the formula (1), is recovered and purified by a known method, and it is recycled.

In a case where the content of the fluorinated emulsifier of the formula (1) in the PTFE low-concentration aqueous dispersion is reduced, for example, in a case where it is reduced to a level of at most 0.05 mass %, based on the mass of PTFE, the concentrating rate may sometimes decrease, but the concentrating rate may be improved by dissolving an anionic emulsifier not containing a fluorine atom, such as sodium laurate, ammonium laurate, ammonium lauryl sulfate, or ammonium perfluorohexanoate in an amount of from 0.01 to 0.3 mass %, based on the mass of PTFE.

The PTFE aqueous dispersion may be obtained by dissolving or adding a nonionic surfactant, a nonfluorinated emulsifier, various leveling agents, a preservative, a coloring agent, a filler, an organic solvent, aqueous ammonia or at least one of other known components, into the PTFE high-concentration aqueous dispersion.

Further, by dissolving a viscosity modifier of polyethylene oxide or polyurethane type, it is possible to further improve the mechanical stability of the PTFE aqueous dispersion, such being desirable.

The content of the viscosity modifier is preferably from 0.01 to 1.0 mass %, particularly preferably from 0.1 to 0.5 mass %. Further, the viscosity of the PTFE aqueous dispersion is preferably from 2 to 1,000 mPa·s, particularly preferably from 3 to 100 mPa·s.

The PTFE product of the present invention means a film, a sheet or a fiber having PTFE as a main component, a heat-resistant article having a PTFE-coating film, or an article containing PTFE as an accessory component, which may be obtained by using the PTFE aqueous dispersion.

Specific examples of the PTFE product include, for example, a packing prepared by impregnating the PTFE aqueous dispersion into a substrate made of a woven cloth of a glass fiber, an aramid fiber, a carbon fiber or other various synthesized fibers or natural fibers, or a braided string, followed by drying; a heat-resistant conveyer belt, a membrane structure sheet for architecture or a material for a printed board, prepared by impregnating the PTFE aqueous dispersion into a substrate made of a woven cloth of a heat-resistant fiber such as a glass fiber, an aramid fiber, a carbon fiber, etc., followed by sintering at a temperature above the PTFE melting point; a kitchen utensil such as a flying pan or an electrical rice-cooker, prepared by coating a metal plate of e.g. aluminum or stainless steel with the PTFE aqueous dispersion having a pigment or a heat-resistant resin blended, followed by sintering; a bonded body prepared by mixing an active material powder for battery such as carbon, manganese dioxide, nickel hydroxide with the PTFE aqueous dispersion; a molding material or a molded product prepared by mixing the PTFE aqueous dispersion to prevent dripping when a plastic molded product of e.g. polycarbonate or ABS resin is burned; a powder having dusting characteristics lowered by mixing the PTFE aqueous dispersion to a chemical fertilizer, lime, burned ash, etc.; an oilless bearing material prepared by coating a porous material with a paste mixture prepared by mixing a filler such as lead, zinc or carbon powder with the PTFE aqueous dispersion; a PTFE fiber prepared by adding a thickening agent such as viscose to the PTFE aqueous dispersion, followed by spinning in a coagulating bath, and then by sintering; an ultra-thin PTFE sheet prepared by coating a heat-resistant sheet substrate such as an aluminum plate or a stainless steel plate with the PTFE aqueous dispersion, followed by sintering, and removing a PTFE layer thereby formed; a coating, a resin, a rubber material, etc., wherein the PTFE aqueous dispersion is added to improve lubricity or antifouling property.

The PTFE product of the present invention may be obtained by coating or mixing the PTFE aqueous dispersion of the present invention, followed by drying or heat-treatment at a temperature of from room temperature to at most 420° C. The temperature is preferably from 50 to 400° C., more preferably from 100 to 395° C. If the temperature is lower than the above, it is difficult to remove water contained in the PTFE aqueous dispersion, and if the temperature is higher than the above, PTFE is likely to be heat-decomposed, and its performance tends to be low.

The content of PTFE in the PTFE product of the present invention may differ depending on the application, but if it is too low, the characteristics of the PTFE will not be fully performed. Therefore, the content is suitably from 0.01 to 100 mass %, preferably from 0.1 to 100 mass %, particularly preferably from 1 to 100 mass %.

The fluorinated emulsifier of the formula (1) tends to sublime or heat-decompose during the heat-treatment, whereby it becomes less than the content in the PTFE aqueous dispersion used.

The content of the fluorinated emulsifier of the formula (1) in the PTFE product of the present invention is from $1\times10^{-7}$ to 0.5 mass %, preferably from $1\times10^{-6}$ to 0.1 mass %, particularly preferably from $1\times10^{-5}$ to $1\times10^{-2}$ mass %, based on the mass of PTFE. In order to reduce the above content to be less than $1\times10^{-7}$ mass %, excess heat-treatment or special washing needs to be carried out for the PTFE product, whereby the characteristics of the PTFE product may deteriorate, or the production cost may increase. Further, the fluorinated emulsifier of the formula (1) is not preferably more than 0.5 mass %, since it is not expected to be easily decomposed in nature.

EXAMPLES

Now, the present invention will be described in further detail with reference to Examples and Comparative Examples, but it should be understood that the present invention is by no means restricted thereto. Further, Examples 1 to 5 represent the present invention, and Examples 6 and 7 represent Comparative Examples. The additives (a) to (g) which were used in respective Examples correspond to additives shown by the corresponding symbols in Tables 2 and 3. The names of the respective additives and chemical formulae are shown in Table 4.

Evaluation methods for the respective items are as follows:
(A) Average particle size of PTFE: Measured by using a laser scattering particle size distribution analyzer (trade name: "LA-920", manufactured by HORIBA, Ltd.).
(B) Standard specific gravity (SSG) of PTFE: Measured in accordance with ASTM D1457-91a and D4895-91a.
(C) Average molecular weight of PTFE: Obtained from the amount of latent heat determined by differential thermal analysis of dried PTFE in accordance with the method of Suwa (described in J. Appl. Polym. Sci, 17, 3253 (1973).
(D) PTFE concentration and surfactant concentration: Approximately 10 g of a dispersion sample was put in an aluminum dish of a known mass and weighed after an hour of drying at 120° C. and after 35 minutes of heat-decomposition of the surfactant at 380° C., and the PTFE concentration and the surfactant concentration based on PTFE were calculated. In the present invention, the surfactant concentration was calculated by including a nonionic surfactant, a fluorinated emulsifier and other thermal decomposition products.
(E) pH: Measured by the glass electrode method.
(F) Viscosity: Measured by using a Brookfield viscometer equipped with a spindle No. 1 at 60 rpm.
(G) Surface tension: Measured by a Du Noüy method using a platinum wire ring.
(H) Mechanical stability: A TYGON tube having an outer diameter of 7.9 mm and an inner diameter of 4.8 mm was mounted on a tubular pump manufactured by Cole Parmer Co., LTD. Both ends of the tube were put into a 200 cc beaker containing 100 cc of a PTFE aqueous dispersion, and the opening was covered with an aluminum foil to prevent the liquid from drying. Using such an apparatus, the PTFE aqueous dispersion was circulated for 2 hours at a liquid flow rate of 200 cc/min at a room temperature of 23° C., whereupon filtration was carried out by means of a 200 mesh nylon filter to collect coagulates, which were dried at 120° C. for 1 hour, whereupon the mass was measured. Here, the amount of such coagulates being at most 5 g was regarded as the mechanical stability being "good", and the amount exceeding 5 g was regarded as "no good".

(I) Impregnation test: A glass fiber filter (GA200, diameter: 25 mm, thickness: 2 mm, manufactured by Advantec Toyo Co, Ltd.) was immersed in the PTFE aqueous dispersion, and the time it took for the filter to completely sink in the liquid was measured. Then, the glass fiber filter was immersed in the PTFE aqueous dispersion for 1 minute and pulled up, followed by drying for 2 hours at 120° C., and the center part was punched out in a diameter of 15 mm and removed to produce a ring-form packing wherein the PTFE was impregnated. The cross-section of this packing was observed by a microscope, and if the PTFE uniformly penetrated into the packing, impregnation was regarded as "good", and if it did not penetrate uniformly, impregnation was regarded as "no good."

(J) Coating test: A sandblasted aluminum plate (thickness 1 mm, 10 cm square) was immersed in the PTFE aqueous dispersion, and then, it was perpendicularly pulled up, followed by drying at room temperature, and sintered for 10 minutes at 380° C. This immersing, drying and sintering were repeated again to carry out double-layer coating of PTFE. The PTFE coating was observed by a microscope, and if there was an abnormal appearance such that coating was not uniformly applied, repelled, pin-holed or cracked on a part other than edges of the aluminum plate, it is regarded as "no good", and if there was no such abnormal appearance, it was regarded as "good."

(K) Concentration of fluorinated emulsifier in the PTFE aqueous dispersion: A calibration curve was preliminarily prepared from peak areas obtained from known concentrations of a fluorinated emulsifier by means of LCMS (high performance liquid chromatography equipped with a mass analyzer). Then, a PTFE aqueous dispersion was dried at 70° C. for 16 hours, and then, the fluorinated emulsifier was extracted with ethanol, and the peak area was measured by LCMS, whereupon using the calibration curve, the concentration of the fluorinated emulsifier in the sample was obtained.

(L) Concentration of fluorinated emulsifier in PTFE fabricated article: The fluorinated emulsifier was extracted with ethanol from a PTFE fabricated article, and the peak area was measured by LCMS, and then the concentration of the fluorinated emulsifier based on the PTFE mass, was obtained.

Reference Example 1

Production Example of $CF_3CF_2OCF(CF_3)CF_2OCF(CF_3)COONH_4$ 2.58 g of CsF and 13.06 g of tetraglyme were charged into a hastelloy c autoclave having a capacity of 200 mL, followed by degassing, and then, 20.83 g of $CF_3COF$ was introduced. Then, the autoclave was cooled to −20° C., and under a hermetically sealed and stirred condition, 57.5 g of hexafluoropropene oxide was introduced over a period of about one hour. The initial pressure showed 0.6 MPa. The reaction was continued for about one hour until the pressure no longer decreased, and then, the autoclave was returned to room temperature to obtain 78.57 g of a reaction crude liquid. This liquid was subjected to a GC analysis, whereby it was found that in addition to the objective product, 49.7% of $CF_3CF_2OCF(CF_3)CF_2OCF(CF_3)COF$, 19.1% of $CF_3CF_2OCF(CF_3)COF$ and 12.8% of $CF_3CF_2O(CF(CF_3)CF_2O)_2CF(CF_3)COF$, were contained.

The same reaction was carried out by using 32.26 g of $CF_3COF$. Distillation and purification were carried out by combining 2 batches of the reaction crude liquid containing the obtained objective product. By using a 30 cm distillation column provided with a reflux condenser and packed with Helipack No. 1, 52.47 g of the objective product having a boiling point of 71° C./400 torr, was obtained. The objective product was charged in a reactor made of PTFE, and 2.32 g of water was drop-wise added with stirring to carry out hydrolysis. Then, HF was removed by nitrogen bubbling to obtain 50.45 g of a crude liquid of $CF_3CF_2OCF(CF_3)CF_2OCF(CF_3)COOH$. The crude liquid was subjected to simple distillation by a simple distillation apparatus made of glass to obtain 40 g of $CF_3CF_2OCF(CF_3)CF_2OCF(CF_3)COOH$.

Then, using 40 g of $CF_3CF_2OCF(CF_3)CF_2OCF(CF_3)COOH$, conversion to an ammonium salt was carried out. Namely, by using a reactor made of glass, 40 g of the above carboxylic acid was dissolved into 150 g of $CClF_2CF_2CHClF$, and then, 10.89 g of 28% aqueous ammonia water was drop-wise added thereto at room temperature to form the ammonium salt. After that, the solvent $CClF_2CF_2CHClF$ was distilled off, followed by drying under reduced pressure to obtain 39.4 g of $CF_3CF_2OCF(CF_3)CF_2OCF(CF_3)COONH_4$ as a white solid.

Reference Example 2

Measurement of 1-Octanol/Water Partition Coefficient (LogPOW)

In accordance with OECD Test Guideline 117, 1-octanol/water partition coefficient (LogPOW) of a fluorinated emulsifier was measured by using HPLC (high performance liquid chromatography).

Conditions for the measurement were as follows: column: TOSOH ODS-120T column (φ 4.6 mm×250 mm), eluent: acetonitrile/0.6 mass % of $HClO_4$ solution=1/1 (vol/vol %), flow rate: 1.0 m/minute, sample amount: 300 μL, column temperature: 40° C., and detection light: UV 210 nm (WO2005-42593).

HPLC was carried out on standard substances (heptanoic acid, octanoic acid, nonanoic acid and decanoic acid) having known 1-octanol/water partition coefficients, and a calibration curve was prepared from the respective elution times and octanol/water partition coefficients of the respective standard substances. Based on this calibration curve, a value of partition coefficient (LogPOW) between 1-octanol and water was calculated from the elution time by HPLC of the fluorinated emulsifier. The results are shown in Table 1.

EEA has a small LogPOW value as compared to ammonium perfluorooctanate (APFO), thus indicating that its bioaccumulation potential is low. On the other hand, $CF_3CF_2OCF(CF_3)CF_2OCF(CF_3)COONH_4$ which was synthesized in Reference Example 1, has a structure similar to EEA, but its LogPOW value is larger than APFO, of which bioaccumulation potential is concerned about, thus indicating that its accumulation in a living organism is high.

Further, in general, in order to judge whether or not a chemical substance is apt to be accumulated in a living organism, a testing method for measurement of a partition coefficient (LogPOW) between 1-octanol and water, is stipulated. As the testing method, in addition to "Partition Coefficient (1-octanol/water) Shake Flask Method" as stipulated in OECD test guideline 107 and in Japanese Industrial Standards Z 7260-107 (2000), a HPLC method (high-performance liquid chromatography) as stipulated and published in OECD Test Guideline 117, is used. A compound having a large partition coefficient value has a large tendency for bioaccumulation, and a compound having a small value means a small tendency for bioaccumulation. In a case where the LogPOW value is less than 3.5, it is considered proper to judge that it is not a high-concentration, and bioaccumulation is also considered to be small.

TABLE 1

| Fluorinated emulsifier | LogPOW |
| --- | --- |
| $CF_3CF_2OCF_2CF_2OCF_2COONH_4$ | 3.13 |
| $CF_3(CF_2)_6COONH_4$ | 3.67 |
| $CF_3CF_2OCF(CF_3)CF_2OCF(CF_3)COONH_4$ | 4.03 |

Example 1

EEA was used as the fluorinated emulsifier. Into a 100 L stainless steel autoclave equipped with a baffle plate and a stirrer, 36 g of EEA, 555 g of paraffin wax (melting point: 55° C.) and 61.3 liters of deionized water were charged. The air in the autoclave was replaced with nitrogen, and then the pressure was reduced. Then, a TFE monomer was added and the temperature was increased to 62° C. with stirring. In addition, the TFE monomer was injected until the inner pressure was raised to 1.765 MPa, and 26.3 g of disuccinic acid peroxide (concentration: 80 mass %, the rest being water) was dissolved in 1 L of warm water at about 70° C. and was injected into the autoclave.

About 3 minutes later, the inner pressure of the autoclave decreased to 1.716 MPa, whereupon the TFE monomer was injected to keep the inner pressure at 1.765 MPa and to let the polymerization proceed. EEA was dissolved in warm water, and the total of 53 g as EEA was added dividedly in two steps during the polymerization. The temperature of the autoclave was gradually raised to 72° C., and the reaction was terminated at a point where the amount of TFE injected reached 22 kg, and TFE in the autoclave was released into the atmosphere. The polymerization time was 105 minutes. After cooling, and the solidified paraffin wax on the surface was removed, and an aqueous PTFE emulsion was obtained. The PTFE concentration in the aqueous emulsion was 25 mass %, and EEA concentration was 0.40 mass % based on the mass of PTFE. The average particle size of the PTFE fine particles in the aqueous emulsion was 0.26 μm. The average molecular weight of the PTFE was 760,000, and the standard specific gravity of the PTFE was 2.21.

By using 10 kg of the obtained aqueous PTFE emulsion, 5.0 mass %, based on the mass of PTFE, of nonionic surfactant (b) (TRITON X100, manufactured by The Dow Chemical Company, molecular formula: $C_8H_{17}$—$C_6H_4$—$(OC_2H_4)_{10}$—OH) and deionized water were dissolved to obtain a PTFE low-concentration aqueous dispersion having a PTFE concentration of 24.2 mass %.

The mechanical stability of the obtained PTFE low-concentration aqueous dispersion was "good". Further, the penetration property in the impregnation test was "good", and a PTFE impregnated packing wherein the PTFE was uniformly impregnated, was obtained. Further, as a result of the coating test, no abnormal appearance was observed, and the coating was "good".

Example 2

By using 10 kg of the PTFE low-concentration aqueous dispersion obtained in Example 1, 10.0 mass %, based on the mass of PTFE, of nonionic surfactant (b), and 0.05 mass %, based on the mass of PTFE, of 28 mass % aqueous ammonia (g) were added, to adjust pH to 9.4. By a phase separation method, the dispersion was concentrated for 10 hours at 80° C., followed by removal of supernatant, and a PTFE high-concentration aqueous dispersion having a PTFE concentration of 66.3 mass %, and a surfactant concentration of 3.0 mass %, based on the mass of PTFE, was obtained.

Into the PTFE high-concentration aqueous dispersion, 3.0 mass %, based on the PTFE mass, of the nonionic surfactant (b) and deionized water were dissolved to obtain a PTFE aqueous dispersion having a PTFE concentration of 60.4 mass %, a surfactant concentration of 6.0 mass %, based on the mass of PTFE, and an EEA concentration of 0.12 mass %, based on the mass of PTFE.

The mechanical stability, the result of the impregnation test, and the result of the coating test of the obtained PTFE aqueous dispersion were "good".

Example 3

By using 10 kg of the PTFE low-concentration aqueous dispersion obtained in Example 1, 3.0 mass %, based on the mass of PTFE, of nonionic surfactant (c) (commercial name: "Newcoal 1308FA", manufactured by Nippon Nyukazai Co., Ltd.), and deionized water were added to make a PTFE low-concentration aqueous dispersion having a PTFE concentration of 24.2 mass %.

This PTFE low-concentration aqueous dispersion was concentrated by electrophoresis with an applied voltage of 200 V/m, to obtain a PTFE high-concentration aqueous dispersion having a PTFE concentration of 66.1 mass %, a surfactant concentration of 2.2 mass %, based on the mass of PTFE.

Into this PTFE high-concentration aqueous dispersion, 6.8 mass %, based on the mass of PTFE, of nonionic surfactant (c), 0.2 mass %, based on the mass of PTFE, of polyethylene oxide (f) (molecular weight: 500,000, manufactured by Wako Pure Chemical Industries, Ltd.), 0.05 mass %, based on the mass of PTFE, of 28 mass % aqueous ammonia (g), and deionized water, were added to obtain a PTFE aqueous dispersion having a PTFE concentration of about 55.8 mass %, a surfactant concentration of 9.0 mass %, based on the mass of PTFE, and an EEA concentration of 0.18 mass %, based on the mass of PTFE.

The mechanical stability, the result of the impregnation test, and the result of the coating test of the obtained PTFE aqueous dispersion were "good".

Example 4

By using 10 kg of the PTFE low-concentration aqueous dispersion obtained in Example 3, 5 mass %, based on the mass of PTFE, of an anion exchange resin (commercial name: "DIAION (registered tradename) WA-30" manufactured by Mitsubishi Chemical Corporation) was added and stirred for 48 hours, to decrease the EEA concentration to 0.012 mass %, based on the mass of PTFE. 0.2 mass %, based on the mass of PTFE, of 28 mass % aqueous ammonia was added to the dispersion, and by a phase separation method, the dispersion was concentrated for 10 hours at 80° C., followed by removal of supernatant, whereby a PTFE high-concentration aqueous dispersion having a PTFE concentration of 65.8 mass %, and a surfactant concentration of 3.1 mass %, based on the mass of PTFE, was obtained.

Then, into this PTFE high-concentration aqueous dispersion, 1.4 mass %, based on the mass of PTFE, of nonionic surfactant (c) and deionized water were dissolved, to obtain a PTFE aqueous dispersion having a PTFE concentration of about 60.8 mass %, a surfactant concentration of 4.5 mass %, based on the mass of PTFE, and an EEA concentration of 0.009 mass %, based on the mass of PTFE.

The mechanical stability, the result of the impregnation test, and the result of the coating test of the obtained PTFE aqueous dispersion were "good".

Example 5

By using 10 kg of the PTFE low-concentration aqueous dispersion obtained in Example 1, 4.0 mass %, based on the mass of PTFE, of nonionic surfactant (d) (TERGITOL TMN-10 manufactured by The Dow Chemical Company, molecular formula: $(C_{12}H_{25}-(OC_2H_4)_{10}-OH$, effective component: 90 mass %) and deionized water were dissolved, to obtain a PTFE low-concentration aqueous dispersion having a PTFE concentration of 24.2 mass %.

A column (internal volume: 770 cc) having a length of 20 cm and an inner diameter of 7.0 cm, and packed with 500 cc of an anion exchange resin (DIAION WA-30), was prepared, and after 2 L of deionized water was run at 500 cc/hr from a tank with difference in height of 5 m, the PTFE low-concentration aqueous dispersion was run through at 500 cc/hr to decrease the EEA concentration in the PTFE low-concentration aqueous dispersion to 0.0032 mass %, based on the mass of PTFE.

The additive (e) (lauryl ammonium sulfate, commercial name: "Emal AD25R manufactured by KAO CORPORATION", effective component: 25 mass %) was added in an amount of about 0.2 mass %, based on the mass of PTFE, followed by concentration by electrophoresis with an applied voltage of 200 V/m, to obtain a PTFE high-concentration aqueous dispersion having a PTFE concentration of about 65.7 mass %, a surfactant concentration of 2.2 mass %, based on the mass of PTFE.

Into this PTFE high-concentration aqueous dispersion, 0.6 mass %, based on the mass of PTFE, of nonionic surfactant (d) and deionized water were dissolved, to obtain a PTFE aqueous dispersion having a PTFE concentration of about 60.8 mass %, a surfactant concentration of 2.8 mass %, based on the mass of PTFE, and an EEA concentration of 0.0020 mass %, based on the mass of PTFE.

The mechanical stability, the result of the impregnation test, and the result of the coating test of the obtained PTFE aqueous dispersion were "good".

Example 6

Emulsion polymerization was carried out in the same manner as in Example 1, except for finishing the polymerization in a period of 60 minutes, to obtain an aqueous PTFE emulsion having a PTFE concentration of 17 mass %, an EEA concentration of 0.59 mass %, based on the mass of PTFE, an average particle size of PTFE fine particles of 0.18 μm, an average molecular weight of PTFE is of 460,000, and SSG of PTFE of 2.23.

The obtained aqueous PTFE emulsion was used as it was for the mechanical stability test, and a large amount of PTFE coagulates was formed and clogged the pump. Therefore, the result was "no good".

In the impregnation test, PTFE did not penetrate into inside, such being "no good", and as a result of the coating test, in addition to repellency, cracks was also observed. Therefore the result was "no good".

Example 7

Into the PTFE aqueous dispersion obtained in Example 2, 0.5 mass %, based on the mass of PTFE, of EEA was additionally dissolved, to make the EEA concentration in the PTFE aqueous dispersion to be 0.65 mass %.

The obtained PTFE aqueous dispersion had a high viscosity, and in the impregnation test, PTFE did not penetrate into inside, so that it was "no good". Further, in the coating test, the PTFE coating became too thick, and the thickness was not uniform. As a result, cracks were observed in whole area, such being "no good".

TABLE 2

| | Items | Unit | Ex. 1 | Ex. 2 | Ex. 3 | Ex. 4 | Ex. 5 |
|---|---|---|---|---|---|---|---|
| PTFE properties | Average particle size | μm | 0.26 | 0.26 | 0.26 | 0.26 | 0.26 |
| | SSG | | 2.21 | 2.21 | 2.21 | 2.21 | 2.21 |
| | Average molecular weight | 10,000 | 76 | 76 | 76 | 76 | 76 |
| Liquid properties | PTFE concentration | mass % | 24.2 | 60.4 | 55.8 | 60.8 | 55.3 |
| | Fluorinated emulsifier | | (a) | (a) | (a) | (a) | (a) |
| | Concentration of fluorinated emulsifier | mass %/PTFE | 0.40 | 0.12 | 0.18 | 0.009 | 0.0020 |
| | Type of surfactants | | (b) | (b) | (c) | (c) | (d) |
| | Surfactant concentration | mass %/PTFE | 5.0 | 6.0 | 9.0 | 4.5 | 2.8 |
| | Viscosity | mPa·s | 3.2 | 20 | 18 | 28 | 24 |
| | pH | | 3.3 | 9.2 | 9.4 | 8.9 | 9.3 |
| | Surface tension | ×10⁻³ N/m | 32.1 | 32.3 | 29.8 | 30.1 | 29.9 |
| Mechanical stability | Amount of coagulates | mass % | 0.8 | 0.7 | 0.5 | 0.9 | 1.1 |
| | Evaluation result | | Good | Good | Good | Good | Good |
| Impregnation test | Penetration time | second | <5 | <5 | <5 | <5 | <5 |
| | Uniformity of PTFE | | Good | Good | Good | Good | Good |
| | Concentration of fluorinated emulsifier in packing | mass %/PTFE | 0.0065 | 0.0037 | 0.0043 | 0.0003 | 0.0001 |
| | Evaluation result | | Good | Good | Good | Good | Good |

TABLE 2-continued

| | Items | Unit | Ex. 1 | Ex. 2 | Ex. 3 | Ex. 4 | Ex. 5 |
|---|---|---|---|---|---|---|---|
| Coating test | Appearance | | Good | Good | Good | Good | Good |
| | Cracks | | — | None | None | None | None |
| | Concentration of fluorinated emulsifier in PTFE coating | mass %/ PTFE | 0.000038 | 0.000021 | 0.000032 | 0.000002 | 0.000001 |
| | Evaluation result | | Good | Good | Good | Good | Good |

TABLE 3

| | Items | Unit | Ex. 6 | Ex. 7 |
|---|---|---|---|---|
| PTFE properties | Average particle size | μm | 0.18 | 0.26 |
| | SSG | | 2.23 | 2.21 |
| | Average molecular weight | 10,000 | 46 | 76 |
| Liquid properties | PTFE concentration | mass % | 17.0 | 60.3 |
| | Fluorinated emulsifier | | (a) | (a) |
| | Concentration of fluorinated emulsifier | mass %/ PTFE | 0.59 | 0.65 |
| | Type of surfactants | | None | (b) |
| | Surfactant concentration | mass %/ PTFE | None | 6.3 |
| | Viscosity | mPa·s | 2.0 | 88 |
| | pH | | 3.4 | 9.1 |
| | Surface tension | ×10$^{-3}$ N/m | 46.3 | 32.2 |
| Mechanical stability | Amount of coagulates | mass % | >20 | 1.5 |
| | Evaluation result | | No good | Good |
| Impregnation test | Penetration time | second | >100 | 16 |
| | Uniformity of PTFE | | Not uniform | Not uniform |
| | Concentration of fluorinated emulsifier in packing | mass %/ PTFE | 0.0121 | 0.0107 |
| | Evaluation result | | No good | No good |
| Coating test | Appearance | | Repellency observed | Film being thick |
| | Cracks | | Observed | Observed |
| | Concentration of fluorinated emulsifier in PTFE coating | mass %/ PTFE | 0.000049 | 0.000048 |
| | Evaluation result | | No good | No good |

TABLE 4

| Additive | Name of formula of additive used | Molecular weight or formula weight |
|---|---|---|
| (a) | EEA(C$_2$F$_5$OCF$_2$CF$_2$OCF$_2$COONH$_4$) | 363 |
| (b) | TRITON X100 manufactured by the Dow Chemical Company (C$_8$H$_{17}$—C$_6$H$_4$O(C$_2$H$_4$O)$_{10}$H) | 646 |
| (c) | Newcoal 1308FA manufactured by Nippon Nyukazai Co., Ltd. (C$_{13}$H$_{27}$O(C$_2$H$_4$O)$_8$OCH(CH$_3$)CH$_2$OH, effective component: 90 mass %) | 610 |
| (d) | TERGITOL TMN-10 manufactured by The Dow Chemical Company (C$_{12}$H$_{25}$O(C$_2$H$_4$O)$_{10}$H, effective component 90 mass %) | 642 |
| (e) | Emal AD25R manufactured by KAO CORPORATION (C$_{12}$H$_{25}$SO$_3$NH$_4$, effective component: 25 mass %) | 267 |
| (f) | Polyethylene oxide manufactured by Wako Pure Chemical Industries, Ltd. | Average molecular weight: 500,000 |
| (g) | 28 mass % aqueous ammonia (NH$_3$) | 17 |

INDUSTRIAL APPLICABILITY

The PTFE aqueous dispersion of the present invention may be used in an application for an electronic material such as a printed board, and in many other applications, such as an application for a roof material for a membrane architectural structure, an application for coating of kitchen utensil, an application for spinning to form a PTFE fiber, an application to prevent dust, an application for active material binder for battery, an application for its incorporation to a plastic.

The entire disclosure of Japanese Patent Application No. 2005-305660 filed on Oct. 20, 2005 including specification, claims and summary is incorporated herein by reference in its entirety.

What is claimed is:

1. A polytetrafluoroethylene aqueous dispersion comprising from 15 to 70 mass % of polytetrafluoroethylene fine particles having an average particle size of from 0.1 to 0.5 μm, from $1\times10^{-5}$ to 0.5 mass %, based on the mass of the polytetrafluoroethylene, of a fluorinated emulsifier of the formula (1):

$$XCF_2CF_2(O)_mCF_2CF_2OCF_2COOA \quad \text{Formula (1)}$$

wherein X is a hydrogen atom or a fluorine atom, A is a hydrogen atom, an alkali metal or NH$_4$, and m is an integer of 0 or 1, and from 1 to 20 mass %, based on the mass of the polytetrafluoroethylene, of a nonionic surfactant.

2. The polytetrafluoroethylene aqueous dispersion according to claim 1, wherein the nonionic surfactant is a nonionic surfactant of the formula (2) and/or the formula (3):

$$R^1\text{—O-A-H} \quad \text{Formula (2)}$$

wherein $R^1$ is a $C_{8-18}$ alkyl group, and A is a polyoxyalkylene chain comprising from 5 to 20 oxyethylene groups and from 0 to 2 oxypropylene groups;

$$R^1\text{—}C_6H_4\text{—}O\text{—}B\text{—}H \qquad \text{Formula (3)}$$

wherein $R^2$ is a $C_{4-12}$ alkyl group, and B is a polyoxyethylene chain comprising from 5 to 20 oxyethylene groups.

3. The polytetrafluoroethylene aqueous dispersion according to claim 1, wherein the nonionic surfactant is a nonionic surfactant of the formula (4):

$$R^3\text{—O-D-H} \qquad \text{Formula (4)}$$

wherein $R^3$ is a $C_{8-18}$ alkyl group, and D is a polyoxyalkylene chain comprising from 5 to 20 oxyethylene groups and from 0.1 to 3 oxybutylene groups.

4. The polytetrafluoroethylene aqueous dispersion according to claim 1, wherein the content of the polytetrafluoroethylene fine particles is from 50 to 70 mass %.

5. The polytetrafluoroethylene aqueous dispersion according to claim 1, wherein the fluorinated emulsifier of the above formula (1) is $CF_3CF_2OCF_2CF_2OCF_2COONH_4$.

6. A polytetrafluoroethylene product, which is obtained from the polytetrafluoroethylene aqueous dispersion as defined in claim 1, and which contains from $1\times10^{-7}$ to 0.5 mass %, based on the mass of the polytetrafluoroethlene, of the fluorinated emulsifier of the formula (1).

* * * * *